March 19, 1963 A. W. HUGHES 3,081,483
APPARATUS FOR ANIMAL IMMOBILIZATION
Filed Sept. 14, 1959 3 Sheets-Sheet 1
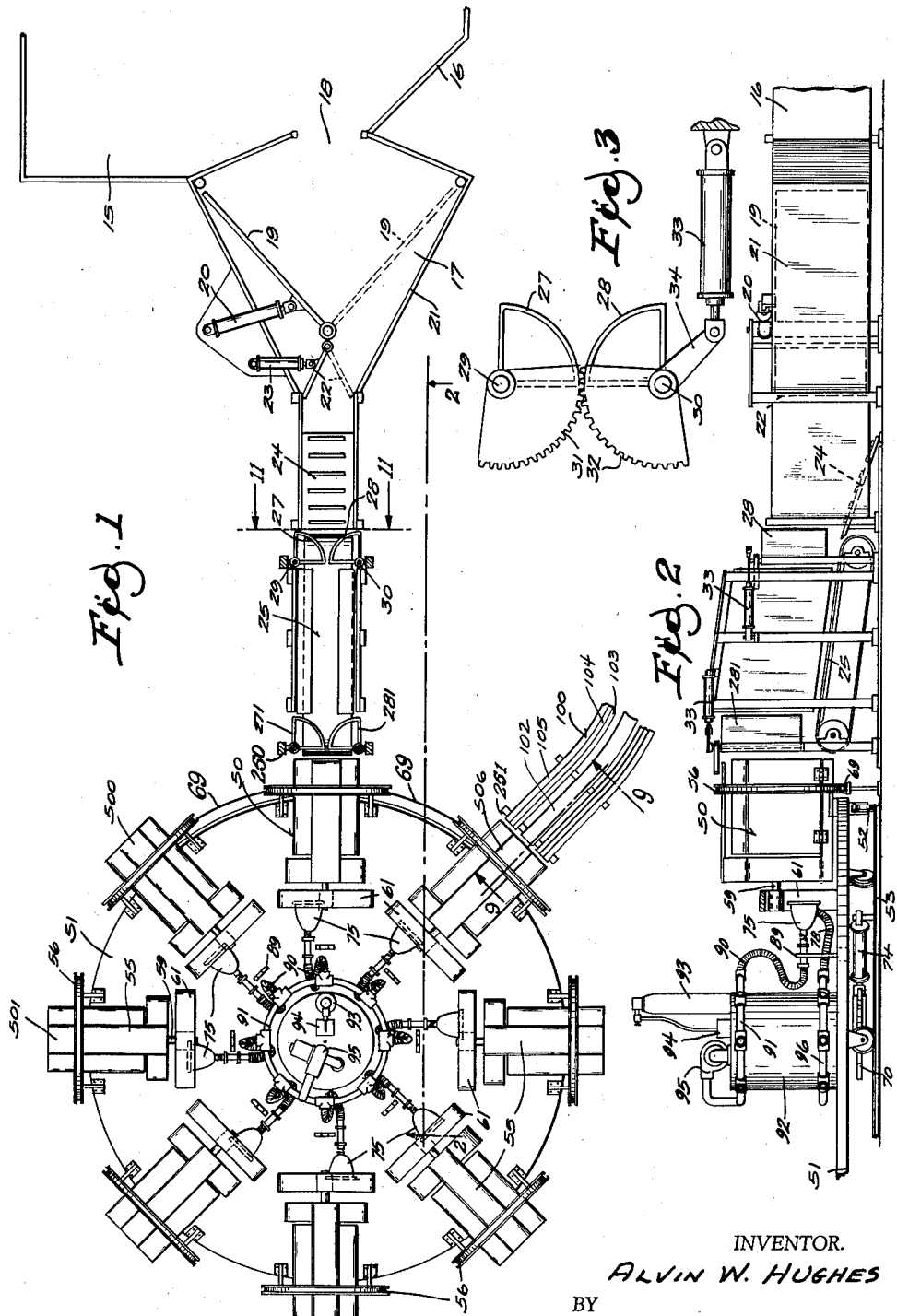
INVENTOR.
ALVIN W. HUGHES
BY
Wheeler, Wheeler & Wheeler
ATTORNEYS March 19, 1963  A. W. HUGHES  3,081,483
APPARATUS FOR ANIMAL IMMOBILIZATION
Filed Sept. 14, 1959  3 Sheets-Sheet 2
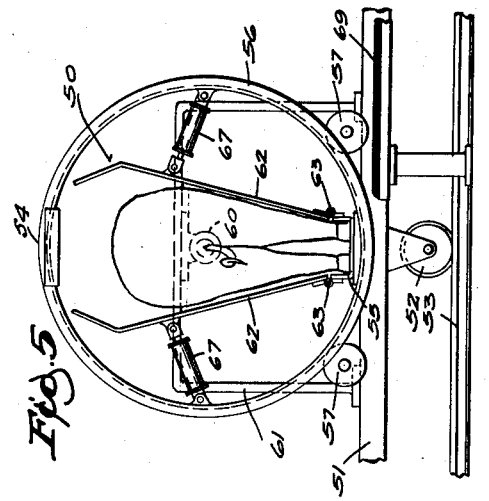
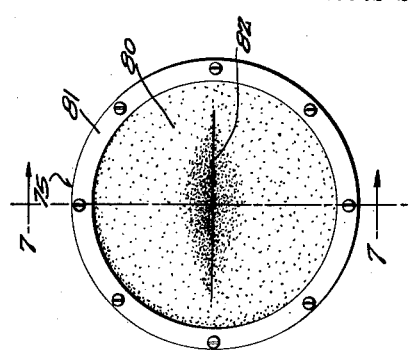
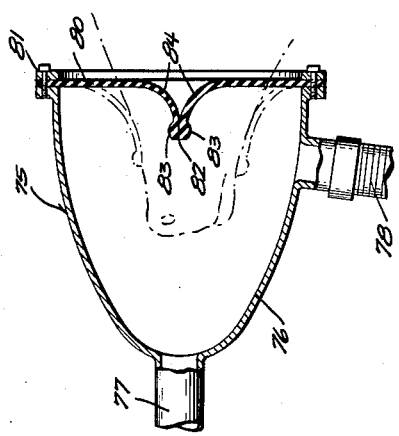
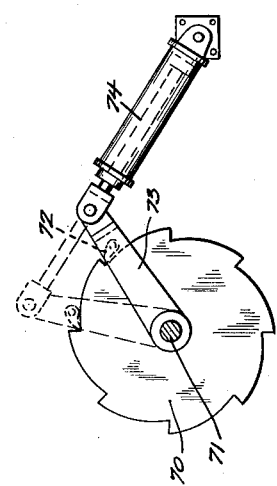
INVENTOR.
ALVIN W. HUGHES
BY
Wheeler, Wheeler & Wheeler
ATTORNEYS

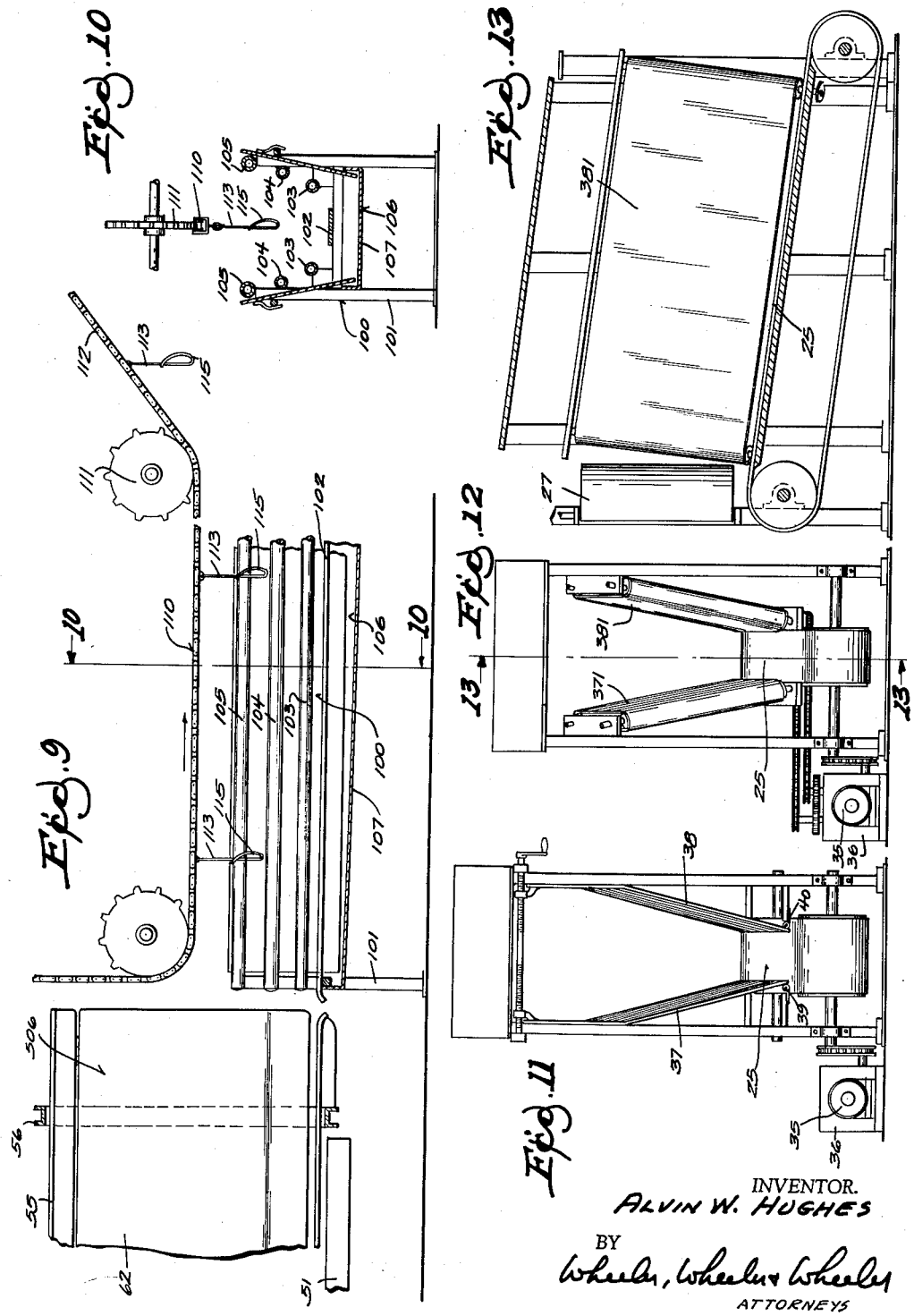

3,081,483
APPARATUS FOR ANIMAL IMMOBILIZATION
Alvin W. Hughes, 4N194 Church Road, Bensenville, Ill.
Filed Sept. 14, 1959, Ser. No. 839,965
19 Claims. (Cl. 17—1)

This invention relates to method and apparatus for animal immobilization. In ordinary usage, the immobilization will be preliminary to slaughtering.

Means subject to the control of an operator includes laterally movable walls and gates and a ramp of which at least a part is motorized, for delivering the animals one at a time into cages mounted on the periphery of a turntable for indexing movement. Each such cage has bearing supports upon which the cage may be inverted. Each cage also is provided with animal-confining means for immediate adjustment of the width of the cage to the width of the animal so that the animal will be firmly confined when the cage turns over.

As the turntable indexes, the cage in which the animal is confined is inverted thus inverting the animal. This immediately renders the animal completely helpless. On the turntable there are immobilizing means for application to the individual animals in their respective cages during turntable rotation. The device is adapted for use with any of the conventional immobilizing means such as electrical or mechanical stunning devices or gas. As disclosed, there are gas masks connected with a source of immobilizing gas and applicable by an attendant to the individual animals inverted in the respective cages. Thus, during successive indexing movements of the turntable, the animals are being immobilized in a gas which is supplied to their respective masks and before the turntable has completed one rotation, the animals are unconscious.

It is extremely important that the animal be bled prior to being lifted, as an animal lifted while its veins still contain blood may rupture blood vessels in the leg that is shackled, thus reducing the value of the resulting meat. Therefore, in accordance with the present invention, a shackle dangling from an overhead conveyor is attached to the animal's hoof while he still lies immobile in the inverted cage. As the shackle draws the animal outwardly over a bleeding rack, the animal is stuck and bled so that by the time the conveyor lifts the animal from the rack, the animal no longer has sufficient blood in its veins to do any damage.

Details of the foregoing structure and incidental apparatus will be described specifically with reference to the attached drawings.

In the drawings:

FIG. 1 is a plan view with certain parts omitted of apparatus embodying the invention.

FIG. 2 is a fragmentary side elevational view, with certain parts omitted, taken generally on the line 2—2 of FIG. 1.

FIG. 3 is an enlarged detail view in plan of a set of animal control gates and means for the operation thereof.

FIG. 4 is an enlarged detail view in side elevation similar to a portion of FIG. 2 but on a larger scale, portions of the apparatus being broken away.

FIG. 5 is a view of one of the invertible cages on the turntable as it appears in end elevation in the plane indicated at 5—5 in FIG. 4.

FIG. 6 is an enlarged detail view of the indexing ratchet of the turntable.

FIG. 7 is an enlarged detail view of the immobilizing mask taken generally along line 7—7 of FIG. 8.

FIG. 8 is an end elevation of the mask shown in FIG. 7.

FIG. 9 is a fragmentary sectional view of a portion of the invertible cage and bleeding rack and shackle conveyor as viewed from the standpoint indicated at 9—9 in FIG. 1.

FIG. 10 is a view of the bleeding rack in cross section on the line 10—10 of FIG. 9.

FIG. 11 is an enlarged detail view, with certain parts omitted, of the motorized portion of the loading rack taken along line 11—11 of FIG. 1.

FIG. 12 is a view similar to FIG. 11 showing a modified loading ramp structure.

FIG. 13 is a view taken in section on the line 13—13 of FIG. 12.

The animals enter the apparatus from a pen 15 of which a portion of the wall is shown at 16 in FIG. 1. They are advanced subject to the control of metering apparatus which includes a smaller pen 17 communicating with pen 15 through an opening at 18 and having a movable partition 19 pivoted to sweep across said opening from the full line position of FIG. 1 to the dotted line position shown therein subject to the control of a ram 20.

As the partition 19 approaches the wall 21 of the metering pen 17, the animal is confined and can progress only forwardly through the pivoted gate 22. This gate is normally retracted in the position which is shown in full lines and may be advanced by ram 23 to a dotted line position behind the animal to prevent him from backing away from the ramp leading to the immobilizing cages on the conveyor hereinafter to be described.

The ramp includes a relatively fixed ramp portion 24 and a motorized ramp portion 25, the latter being in the nature of a treadmill but operated to advance the animals forwardly. An animal can stand motionless upon ramp portion 24 pending disposition of an animal which is already being propelled upwardly on ramp portion 25. Between these two ramp portions, there are gates 27, 28 which are oscillatory upon rock shafts 29 and 30, and connected for concurrent operation. In the particular arrangement shown, gear segments 31 and 32 on rock shafts 29 and 30 provide the desired connection. Operation of the illustrated device is by means of a ram 33 acting on one of the rock shafts through a rocker arm 34. Gates 27 and 28 present arcuate surfaces of substantial uniform radius to the animal which may be standing on the stationary ramp portion 24 so that the opening of the gate does not frighten the animal or tend to push it rearwardly on such ramp portion.

When the motorized ramp portion 25 is free, the gates 27 and 28 will be opened by swinging them out in front of the animal and the animal will be caused by prods or otherwise to advance onto the movable ramp portion 25 which comprises a conveyor which may be driven from motor 35 (FIG. 11) through a gear reducer 36. The animal is laterally confined by side walls 37 and 38 which are desirably hinged at their bottom margins as shown at 39 and 40 in FIG. 11, whereby they may be adjusted to confine closely animals of different sizes, regardless of the animal's width. FIGS. 12 and 13 show a motorized ramp portion which is identical so far as the conveyor apron 25 is concerned but has, in conjunction with the motorized supporting belt, side walls 371 and 381 which likewise comprise motorized aprons so that the animal will be positively propelled forwardly both by the belt 25 on which his feet are supported and by the sides 371 and 381 which may engage his flanks.

At the forward end of the motorized ramp section 25, there is a loading station 125 which desirably includes another set of the pivoted gates 271, 281 identical with gates 27, 28 as already described. These are opened as the animal is advanced by the motorized ramp 25 and closed after the animal passes through them and enters the cage generically designated by reference character 50.

As shown, there are eight of the cages 50 mounted on a turntable 51. The turntable may conveniently be supported by wheels 52 from a track 53 as shown in FIGS. 2, 4 and 5.

Each cage comprises a top member 54 and a channel-shaped bottom member 55 mounted within a ring 56 which supports the weight of the cage upon rollers 57 on the turntable. By rotating the cage upon the bearings provided by the ring 56 and rollers 57, each cake individually may be inverted. To steady the cage in its inverting rotation, there is a stud 59 on the cage front wall 58 which projects into a bearing 60 mounted on stand 61 on the turntable. With the cage right-side-up the front opening which is then above the stud 59 is closed by a hinged frame wall portion 560 which may later be opened in the inverted position of the cage to permit ready access to the animal's head and to aid in permitting the animal to be immobilized.

The cage sides include relatively movable side wall portions 62 (FIG. 5), these being hinged at 63 to the flanges of the bottom channel 55. The channel is wide enough for the animal's feet. The sides diverge upwardly at an included angle which may be varied by oscillating the respective side walls 62 upon their hinges 63 through the medium of rams 67. The sides will ordinarily be retracted sufficiently so that the animal will move freely into the cage. When the animal is in the cage and the gates 271, 281 are closed behind him, the rams 67 will be charged with fluid pressure to pivot the side walls 62 of the cage into engagement with the sides of the animal, thereby closely confing the animal against movement in any direction.

The cage is readily rotatable by hand when unloaded. When it contains an animal, it is, of course, fairly heavy. To assist in the inversion of the cage and the animal contained therein, a stationary rubber-covered rail is desirably provided at 69 in a position to be engaged by the cage ring 56 as soon as each cage 50 leaves the loading station in which it registers with the power-operated ram 25 and the gates 271, 281. Thus, as the turntable is indexed, the initial movement will engage the cage ring 56 with rail 69 and the rotation of the ring on the rail will invert the cage and the animal. The cages shown at 500 and 501 (and all of the other cages except at the loading station) are shown in their inverted positions.

Turntable indexing movement may be supplied in any desired manner but it is convenient to use a ratchet 70 mounted on the turntable shaft 71 and actuated by a pawl 72 carried by lever 73 which is pivoted on shaft 71 and driven by ram 74 under the control of the operator (see FIGS. 2, 4 and 6). As soon as possible after the animal is confined in the cage by engagement between the hinged sides 62 thereof (certainly as soon as the indexing movement of the cage on turntable 51 has progressed to the point where the animal is helpless) the animal will be immobilized by any desired method. The head of the animal is readily accessible for electrical or mechanical stunning but it is preferred, for the purposes of this disclosure, to immobilize the animal by applying over the animal's mouth and nose a mask such as that shown at 75 in FIGS. 7 and 8. This mask comprises a shell 76 having a gas inlet pipe 77 which serves as a handle for the manipulation of the mask. The mask desirably has a gas circulating return pipe 78.

At the front of the shell 76, a slit diaphragm 80 is fixed by a ring 81. The diaphragm has a transverse slit at 82 with beaded margins 83 toward which the diaphragm converges inwardly at 84 as best shown in FIG. 7. When the mask is forced partially onto the snout of an animal as shown in dotted lines in FIG. 7, the slit receives the animal's snout, the beaded margins being separated as shown in dotted lines, the fit around the animal's snout is sufficiently close to require the animal to breath air saturated with the immobilizing gas to any desired extent.

To keep the mask from falling away from the animal's snout, its gas inlet 77 desirably has the form of a rigid pipe serving as a handle for manipulation of the mask and flanged at 86, 87, 88 for engagement with the forked upper end of a standard 89 as shown in FIG. 1 and FIG. 4. The selective positioning of the pipe 77 with respect to the standard will hold the mask to the animal's head in any position at which the respective flange 86, 87 or 88 is engaged with the standard 89. A flexible hose 90 connects the end of pipe 77 with a manifold 91 that encircles the gas mixture tank 92.

The gas cylinder 93 opens into the tank 92 through an equalizer valve 94 which maintains the mixture approximately constant but which forms no part of the present invention. A blower 95 delivers the mixture from the tank 92 into the manifold 91 which supplies the various masks. The flexible return hoses 78 from the several masks lead into a manifold 96 whereby the mixture is recirculated into the tank 92. The slight pressure provided by the blower 95 assures that any leakage through the diaphragm which confines the animal's head will tend to be outward rather than inward. At the same time, there is not a great deal of pressure within the mask because of the recirculation provided by the hoses 78 which return the gas to the tank at the suction side of the blower. The mask eliminates the tunnel and pit methods in present day use, making possible a more efficient use of gas and rendering animals unconscious in a shorter time. The mask is of considerable importance for confining gas when lighter than air immobilizing gases are used.

It is not necessary to use a gas which anesthetizes the nerve centers of the animal. In preferred practice, the gas used is carbon dioxide, nitrogen or argon or other non-toxic inert gas and it operates to immobilize the animal simply by depriving him of adequate oxygen for the maintenance of consciousness.

The weight of the animal in the inverted cage will tend to maintain the cage inverted. When the animal is withdrawn, following immobilization, the cage will tend to return by gravity to its original erect position.

The immobilized animals may, for some purposes, be unloaded at any station in the course of advance of their respective cages with the turntable. In preferred practice, the unloading station 251 is immediately adjacent the loading station 250. The unloading station is that at which FIG. 1 shows a cage 506. Extending outwardly from the unloading station is the bleeding rack 100 as best shown in FIGS. 1, 9, 10. This rack comprises a frame 101 with a supporting strip 102 on which the weight of the immobilized animal is carried. At suitable spacing along the sides are tubular bars 103, 104, 105 between which the body of the animal is confined. Beneath the rack is a blood-collecting trough 106 which is preferably inclined or has a pitched bottom 107.

Extending longitudinally along the rack overhead is a shackle conveyor run 110. Only a portion of the endless conveyor is illustrated. In passing over a sprocket 111 remote from the turntable, the conveyor has a run extending upwardly as shown at 112 in FIG. 9.

Depending at intervals from the conveyor are the thongs 113 with shackles 115 at their ends. An attendant will engage such a shackle with the hoof of an immobilized animal as the latter lies within the cage at the unloading point. The side wall portions 62 of the cage being retracted by the relief of pressure in the ram cylinders 67, the animal will be released so that the continued movement of the conveyor will cause the shackle to pull the animal along the rack. Immediately the animal will be "stuck" by opening a blood vessel in its throat.

As the animal slides along the rack, its blood will flow into the trough 106 and be delivered to a suitable point of collection. Meantime, by the time the conveyor run 112 lifts the shackle and the animal to which it is attached, the animal will no longer have the strength to resist and will no longer have sufficient blood left in its veins to cause damage to the meat if a blood vessel ruptures in the animal's leg when the animal is lifted. Therefore the meat will not be damaged.

This application is a companion to my application Serial No. 536,389, now Patent No. 2,978,737 wherein the use of such a bleeding rack and the method of immobilizing and bleeding as above described has been disclosed. An important feature is to carry the weight of the animal along the rack until the bleeding has progressed sufficiently far so that no damage will result when the animal is lifted. The animal is supported from below, with or without movement along the rack, until the bleeding has rendered it incapable of effective resistance and the animal is then lifted and suspended from above for the completion of bleeding.

While it will be apparent that all of the various features disclosed are usefully cooperative in the assembly described, it will be equally apparent to those skilled in the art that some of these features may be used independently in other types of apparatus for animal immobilization or otherwise. In the appended claims, separate claims are submitted to these subcombinations.

Apart from the subcombination claims relating to bleeding, the invention includes a method of immobilization which involves the lateral confinement of an individual animal and his inversion immediately preceding the immobilization. The method includes the application of a mask to each individual animal, a supply of the immobilizing gas to the mask preferably being recirculated therethrough. This eliminates the tunnel and pit treatments heretofore proposed and makes much more efficient use of the gas. A single operator stationed on the turntable can do the immobilizing. The only other operators required are the operator who controls the admission gates and turntable movement and the operator who does the shackling and sticking.

While the invention has been described with particular reference to animal slaughtering, those skilled in the art will recognize that animals may be handled in the appropriate portion of this apparatus for other purposes, including treatment by a veterinarian, the lateral confinement of the animal and inversion of his cage being sufficient, without more, to protect both the animal and the veterinarian. Similarly, for other purposes, it may be desired to administer gas to an animal without the inversion step and for purposes other than slaughtering. The mask, particularly as used with the means for preventing displacement thereof by locking the mask and animal against separation, is a convenient device for these purposes.

I claim:

1. Apparatus of the character described comprising a cage which is elongated in the direction of the length of the animal to be confined therein and which has side walls in adjustable connection with the cage for movement to and from each other for confining an animal in the cage, a pivotal support for the cage upon which the cage and a confined animal are invertible about an axis extending lengthwise of the cage, and a rear gate having a support independent of the cage and which is provided with means upon which the gate is mounted for movement to and from a position transverse respecting the cage for barring egress of an animal from the cage, the cage being invertible independently of said gate and the disposition of said gate being unaffected by inversion of said cage.

2. The device of claim 1 in which the cage includes a top member and a bottom member adapted to support the weight of the animal when the cage is respectively upright and inverted, the side walls being pivoted adjacent one of said members and having portions movable toward each other and toward an intervening animal.

3. An animal immobilizing device comprising
   a loading station,
   an unloading station spaced from said loading station,
   a carriage,
   a cage rotatably mounted on said carriage, said cage being adapted to receive an animal,
   means connected to said carriage for moving said carriage to locate said cage at said loading and unloading stations,
   means on said cage for confining the animal within the cage to preclude his escape therefrom, and
   means operative in response to carriage movement for inverting the cage upon its mounting.

4. An immobilizing device for animals preliminary to slaughtering thereof which comprises a horizontally rotatable support or turntable, a substantially radially arranged cage on said support, said cage being mounted for turning movement about a horizontal axis, said cage having a circumferentially arranged track means, coacting means coaxially arranged with respect to said support, said coacting means having two effective portions, said cage being adapted to move past loading and unloading stations, and said coacting means being positioned on each side of said loading station.

5. The device of claim 3 in which the cage mounting includes a ring connected with the cage, rollers connected with the carriage and upon which the ring rides, and said means for inverting the cage includes a stationary track adjacent the carriage in a position to be engaged by said ring in the course of carriage movement for the rotation of the ring and inversion of the cage.

6. In an animal immobilizing device, the combination of
   an animal loading station,
   an animal unloading station,
   a turntable,
   a track on which said turntable is rotatably movable between said stations,
   means for step-by-step rotational advance of said turntable,
   a plurality of cages mounted on said turntable for rotation relative thereto, each cage including an end adapted to receive an animal,
   means for confining an animal within the cage to preclude his escape therefrom including a movable closure having a fixed support located adjacent the turntable at said loading station and with which successive cages register in response to step-by-step advance of said turntable, and
   means operative in response to turntable movement for inverting said cage.

7. The device of claim 6 in which said closure comprises at least one gate having an arcuate surface in the path of an animal advancing toward the turntable, said gate being pivoted substantially coaxially with the arc of said surface whereby the opening of the gate to withdraw it from the path of the animal does not entail any gate movement rearwardly of said path.

8. An animal immobilizing apparatus comprising the combination with a turntable and means for the stepped intermittent partial rotation and dwell thereof, of means defining loading and unloading stations with which successive portions of the turntable register during the periods of dwell, a cage mounted on the turntable and positioned to register with said stations at intervals of turntable dwell, and means on the turntable for immobilizing an individual animal in said cage.

9. The device of claim 8 in which the immobilizing means comprises a gas mask and flexible gas connection, the mask being manually applicable to an animal in said cage.

10. The device of claim 8 in which the turntable is provided with a plurality of cages with entry portions disposed radially of the turntable in positions to register successively with respective stations, each having immobilizing means individual thereto for immobilizng anmals in the respective cages.

11. The device of claim 10 in which such immobilizing means comprises a separate gas mask for each cage, a gas supply having flexible connections to the respective masks and adjustable supports with which the several masks are detachably connected for appropriate positioning to hold them in place on the animals in the respective cages.

12. The device of claim 8 in further combination with ramp means leading to the loading station, the ramp means including a belt, means supporting the belt at an upward inclination and means for operating the belt in a direction to advance an animal thereon upwardly toward said station and turntable.

13. The device of claim 8 in further combination with a gate having a fixed location and positioned between the loading station and the turntable cage for controlling access of the animal from the loading station into said cage.

14. The device of claim 8 in which the turntable is provided with bearing rollers and a spindle bearing and the cage is provided with a ring supported on the rollers and with a spindle supported in the spindle bearing, whereby the cage may be inverted.

15. The combination set forth in claim 8 in which the turntable is provided with a plurality of cages and with pivotal mountings supporting all of said cages for rotation on axes generally radial respecting the turntable whereby to invert the respective cages and animals therein confined.

16. The device of claim 15 in which each such cage is provided with means individual to the cage for immobilizing the animal confined therein.

17. Animal immobilizing apparatus comprising the combination with a turntable and means for the rotative advance thereof in steps of less than 360° with intermittent periods of dwell, of rollover cages disposed radially on the turntable and for which the turntable is provided with bearings, each of said cages including laterally movable side wall members, and means for advancing said members toward each other to confine an animal in the cage, means defining loading and unloading stations with which such successive cages register during periods of dwell, the loading station including means defining a runway leading toward the turntable and a gate openable to permit an anmial to advance on the runway into the cage and closable behind such animal to preclude his escape pending his engagement by the movable side wall portion aforesaid, the unloading station including a bleeding rack and a conveyor having suspended shackles engageable with the hoof portions of successive animals to withdraw the animals from cages registering with the unloading station and propel them along the bleeding rack, said conveyor having a portion deviating from said rack and adapted to hold the respective animals suspended during the completion of bleeding, the said conveyor being provided with means individual to its several cages for immobilizing the individual animals in such cages during travel of the cages between the loading station and the unloading station aforesaid.

18. The device of claim 17 in which the means individual to the cages for the immobilizing of animals comprises gas masks manually engageable with the animals and having gas supply connections, each mask including a flexible diaphragm having an opening to receive nose portions of the animal for confining the gas about said portions.

19. The device of claim 17 in which the runway leading to the loading station comprises a ramp having a floor portion of which at least a part is movable in an upward direction and comprises a conveyor apron and a suitable support therefor.

References Cited in the file of this patent

UNITED STATES PATENTS

| | | |
|---|---|---|
| 262,373 | Cole | Aug. 8, 1882 |
| 543,393 | Mead | July 23, 1895 |
| 621,116 | Mandel | Mar. 14, 1899 |
| 651,499 | Byrd | June 12, 1900 |
| 1,701,902 | Weinberg | Feb. 12, 1929 |
| 1,753,851 | Dever | Apr. 8, 1930 |
| 2,275,534 | Langsdorf | Mar. 10, 1942 |
| 2,526,037 | Murphy | Oct. 17, 1950 |
| 2,536,268 | Dillon | Jan. 2, 1951 |
| 2,675,783 | Sears | Apr. 20, 1954 |
| 2,733,477 | Murphy | Feb. 7, 1956 |
| 2,841,142 | Hay | July 1, 1958 |
| 2,841,817 | Murphy | July 8, 1958 |
| 2,895,164 | Murphy | July 21, 1959 |